(12) United States Patent
Tsumiyama et al.

(10) Patent No.: US 10,124,832 B2
(45) Date of Patent: Nov. 13, 2018

(54) FRAME STRUCTURE OF UTILITY VEHICLE

(71) Applicant: KAWASAKI JUKOGYO KABUSHIKI KAISHA, Hyogo (JP)

(72) Inventors: Yoshinori Tsumiyama, Miki (JP); Teruaki Yamamoto, Himeji (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/393,383

(22) Filed: Dec. 29, 2016

(65) Prior Publication Data

US 2018/0186409 A1    Jul. 5, 2018

(51) Int. Cl.
   *B62D 21/18*    (2006.01)
   *B62D 21/02*    (2006.01)
   *B62D 23/00*    (2006.01)
   *B60R 21/13*    (2006.01)

(52) U.S. Cl.
   CPC ............ *B62D 21/183* (2013.01); *B60R 21/13* (2013.01); *B62D 21/02* (2013.01); *B62D 23/005* (2013.01); *B60Y 2200/124* (2013.01); *B60Y 2410/124* (2013.01)

(58) Field of Classification Search
   CPC ...... B62D 21/183; B62D 21/02; B62D 21/13; B62D 23/005; B60Y 2200/124; B60Y 2410/124

USPC .......................................................... 296/205
See application file for complete search history.

(56) References Cited

U.S. PATENT DOCUMENTS

| 6,729,431 | B2 * | 5/2004 | Osuga .................. B62D 21/186 |
| | | | 180/312 |
| 8,869,929 | B2 | 10/2014 | Yamamoto |
| 2004/0206567 | A1 * | 10/2004 | Kato ........................ B60G 7/02 |
| | | | 180/291 |

* cited by examiner

*Primary Examiner* — D Glenn Dayoan
*Assistant Examiner* — Dana D Ivey
(74) *Attorney, Agent, or Firm* — Wenderoth, Lind & Ponack, L.L.P.

(57) ABSTRACT

A frame structure of a utility vehicle includes: a left bottom first frame and a right bottom second frame that extend in a front-rear direction and support a floor plate; a bottom front frame that couples a front end of the left bottom first frame and a front end of the right bottom second frame and extends linearly in a vehicle width direction and to which a first support member for a first gear box for front wheels is welded; and a bottom rear frame that couples a rear end of the left bottom first frame and a rear end of the right bottom second frame and extends linearly in the vehicle width direction and to which a second support member for a second gear box for rear wheels is welded, each of the bottom front frame and the bottom rear frame being a cylindrical pipe frame.

5 Claims, 8 Drawing Sheets

FRAME STRUCTURE OF UTILITY VEHICLE

BACKGROUND OF THE INVENTION

1. Field of the Invention

The present invention relates to a frame structure of a utility vehicle.

2. Description of the Related Art

Conventionally, a body frame of a utility vehicle has a complicated shape because a plurality of pipes are coupled in a front-rear direction and a vehicle width (left-right) direction in order to attain predetermined strength and rigidity, as described in U.S. Pat. No. 8,869,929 B2.

This tends to complicate steps for manufacturing a body frame and increase cost of the body frame.

SUMMARY OF THE INVENTION

In view of this, a purpose of the present invention is to provide a frame structure of a utility vehicle that can be made simple while keeping strength and rigidity.

In order to attain the above purpose, the present invention provides a frame structure of a utility vehicle, including: a pair of left and right bottom first frame and bottom second frame that extend in a front-rear direction and support a floor plate; a bottom front frame that couples a front end of the bottom first frame and a front end of the bottom second frame and extends linearly in a vehicle width direction and to which a first support member of a gear box for front wheels is welded; and a bottom rear frame that couples a rear end of the bottom first frame and a rear end of the bottom second frame and extends linearly in the vehicle width direction and to which a second support member of a gear box for rear wheels is welded, the bottom front frame and the bottom rear frame each being a cylindrical pipe frame.

According to the configuration, since cylindrical pipe frames extending linearly in the vehicle width direction are provided on front and rear sides, the bottom front frame and the bottom rear frame and other frames are easily welded. As a result, it is possible to provide a simple frame structure of a utility vehicle while keeping predetermined strength and rigidity without the need to employ a configuration in which body frames are coupled in a front-rear direction and a vehicle width direction.

The present invention preferably further includes the following configurations.

(1) An external diameter of the bottom front frame is equal to or larger than shapes of cross sections of the bottom first frame and the bottom second frame at parts thereof coupled to the bottom front frame.

(2) An external diameter of the bottom front frame is equal to or larger than a shape of a cross section of the first support member at a part thereof coupled to the bottom front frame.

(3) An external diameter of the bottom rear frame is equal to or larger than shapes of cross sections of the bottom first frame and the bottom second frame at parts thereof coupled to the bottom rear frame.

(4) An external diameter of the bottom rear frame is equal to or larger than a shape of a cross section of the second support member at a part thereof coupled to the bottom rear frame.

According to the configuration (1), since the external diameter of the bottom front frame is equal to or larger than the cross-sectional shapes of the bottom first frame and the bottom second frame, the bottom first frame and the bottom second frame can be coupled to the bottom front frame throughout the cross sections thereof. This makes it possible to increase the area of coupling between the bottom front frame and the bottom first frame and the area of coupling between the bottom front frame and the bottom second frame. It is therefore possible to increase strength and rigidity of a part where the bottom front frame and the bottom first frame are coupled and a part where the bottom front frame and the bottom second frame are coupled.

According to the configuration (2), since the external diameter of the bottom front frame is equal to or larger than the cross-sectional shape of the first support member, the first support member can be coupled to the bottom front frame throughout the cross section thereof. This makes it possible to increase the area of coupling between the bottom front frame and the first support member. It is therefore possible to increase strength and rigidity of a part where the bottom front frame and the first support member are coupled.

According to the configuration (3), since the external diameter of the bottom rear frame is equal to or larger than the cross-sectional shapes of the bottom first frame and the bottom second frame, the bottom first frame and the bottom second frame can be coupled to the bottom rear frame throughout the cross sections thereof. This makes it possible to increase the area of coupling between the bottom rear frame and the bottom first frame and the area of coupling between the bottom rear frame and the bottom second frame. It is therefore possible to increase strength and rigidity of a part where the bottom rear frame and the bottom first frame are coupled and a part where the bottom rear frame and the bottom second frame are coupled.

According to the configuration (4), since the external diameter of the bottom rear frame is equal to or larger than the cross-sectional shape of the second support member, the second support member can be coupled to the bottom rear frame throughout the cross section thereof. This makes it possible to increase the area of coupling between the bottom rear frame and the second support member. It is therefore possible to increase strength and rigidity of a part where the bottom rear frame and the second support member are coupled.

According to the present invention, it is possible to provide a frame structure of a utility vehicle that can be made simple while keeping strength and rigidity.

DETAILED DESCRIPTION OF THE INVENTION

A utility vehicle having a frame structure according to an embodiment of the present invention will now be described below with reference to the accompanying drawings. A utility vehicle is a vehicle mainly for off-road travelling not only on a grass field, a gravel field, and a sandy field, but also on unpaved mountain road and forest road, a muddy road, and a rocky field. For convenience of description, it is assumed that a direction toward which the utility vehicle travels is a "front side" of the utility vehicle and parts thereof and that left and right, in a vehicle width direction, of a driver of the utility vehicle facing forward are "left and right" of the utility vehicle and the parts thereof.

[Overall Structure of Vehicle]

Figure 1:
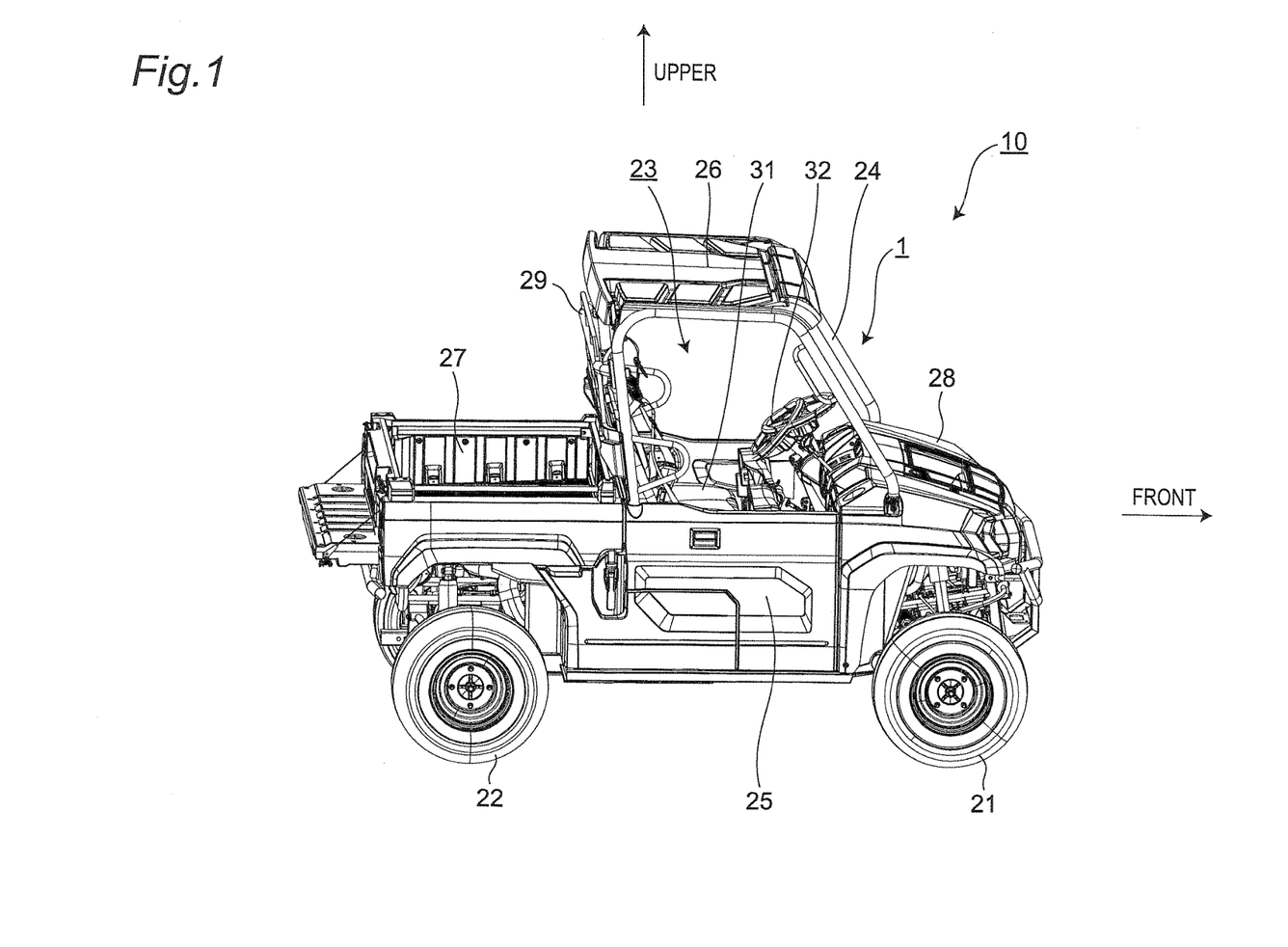
FIG. 1 is a perspective view of a utility vehicle having a frame structure according to an embodiment of the present invention.

FIG. 1 is a perspective view of a utility vehicle having a frame structure according to an embodiment of the present invention.

As illustrated in FIG. 1, a utility vehicle 10 includes a pair of left and right front wheels 21 on a front side of a body thereof, a pair of left and right rear wheels 22 on a rear side of the body, and a riding space (cabin) 23 between the front wheels 21 and the rear wheels 22. The riding space 23 is surrounded by a ROPS 24, a pair of left and right doors 25, and a top plate 26. The ROPS is an abbreviation of a rollover protective structure, and is part of a body frame 1. The top plate 26 is attached onto an upper end of the ROPS 24.

A cargo bed 27 is provided behind the riding space 23, and a bonnet 28 is provided ahead of the riding space 23. A screen 29 that serves as a partition between the cargo bed 27 and the riding space 23 is provided at a front end of the cargo bed 27.

A pair of left and right independent seats 31 are provided in the riding space 23. Operating units such as a steering wheel 32 and the like are provided ahead of the seats 31.

[Frame Structure]

Figure 2:
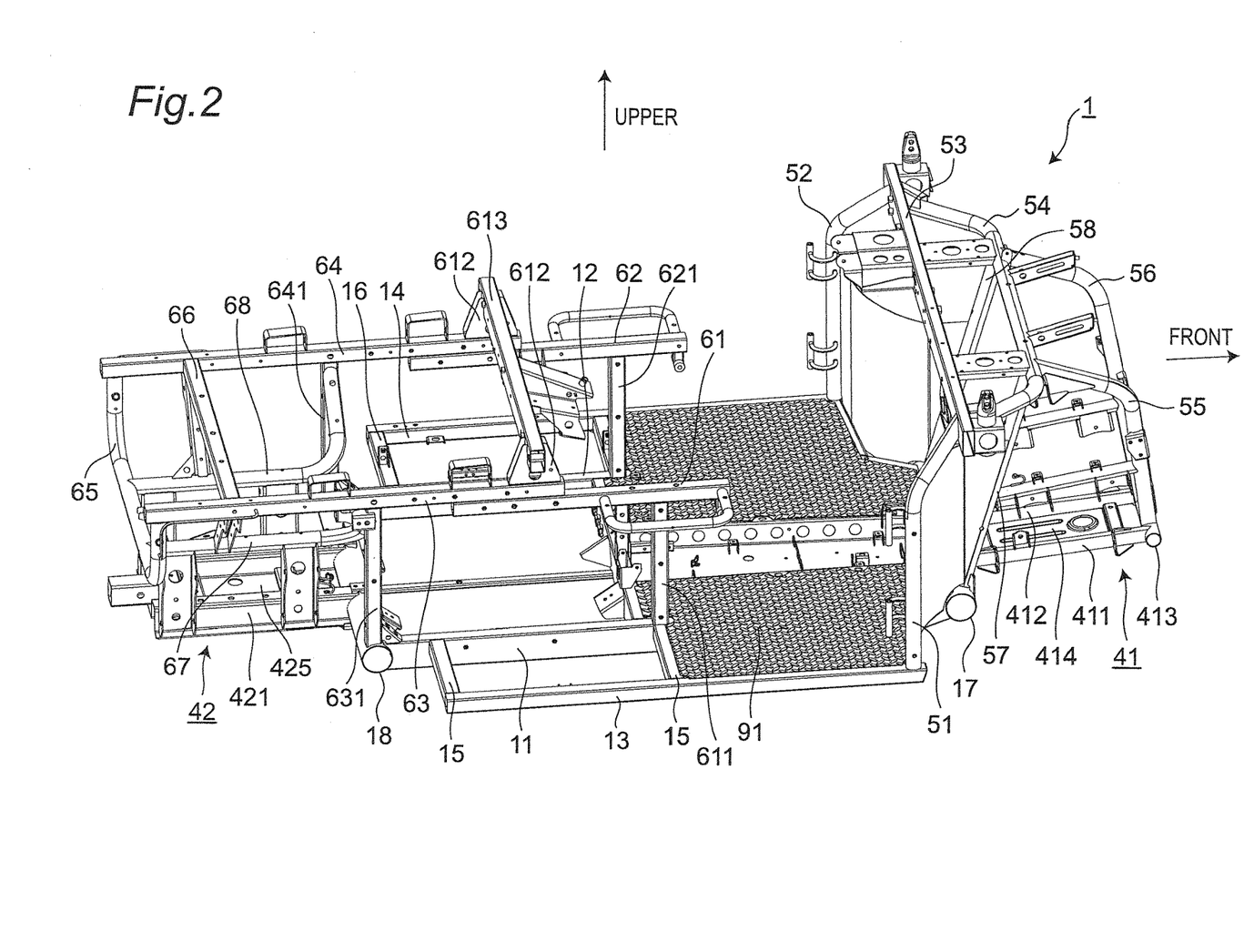
FIG. 2 is a perspective view of a body frame of the utility vehicle of FIG. 1.
Figure 3:
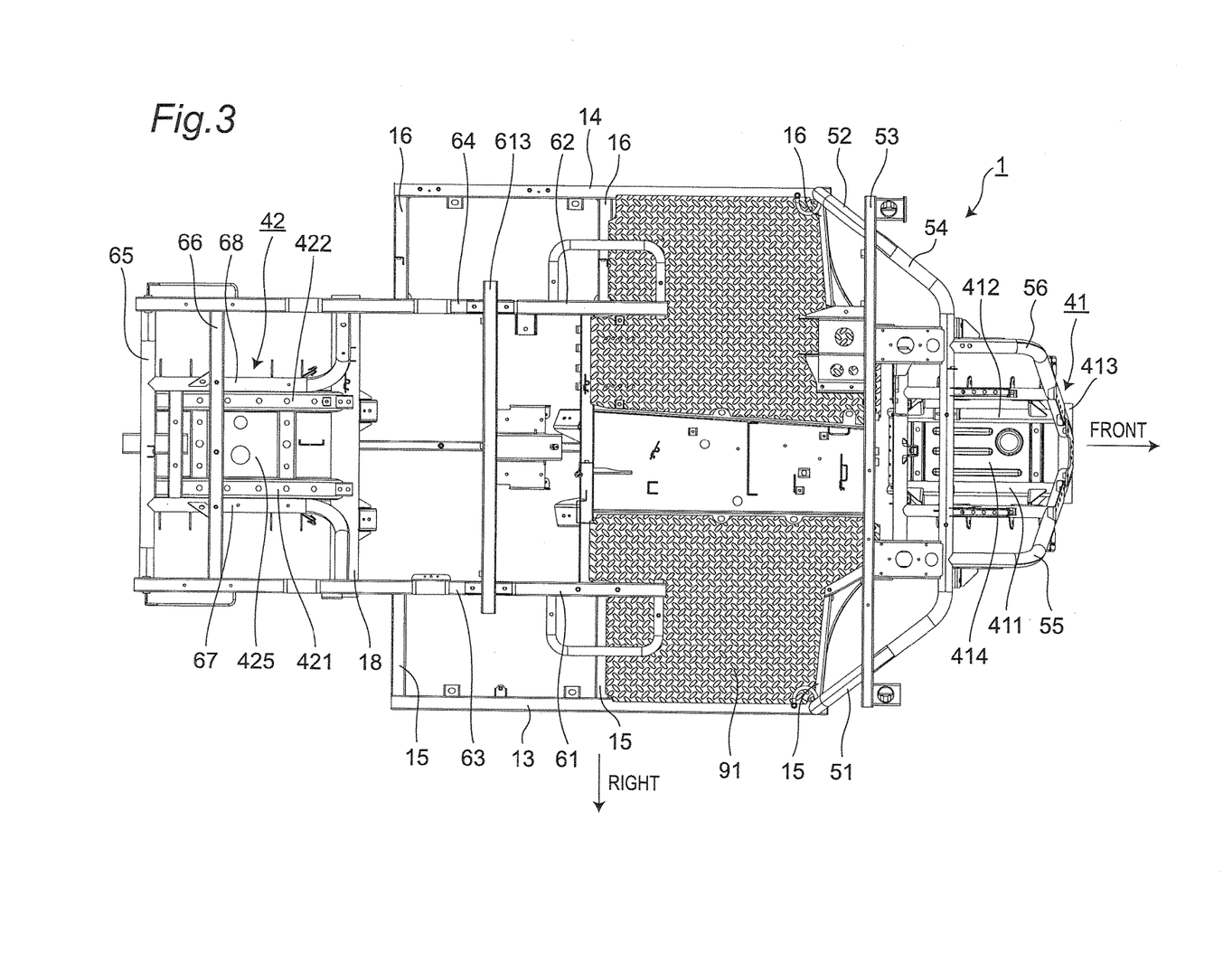
FIG. 3 is a top view of FIG. 2.
Figure 4:
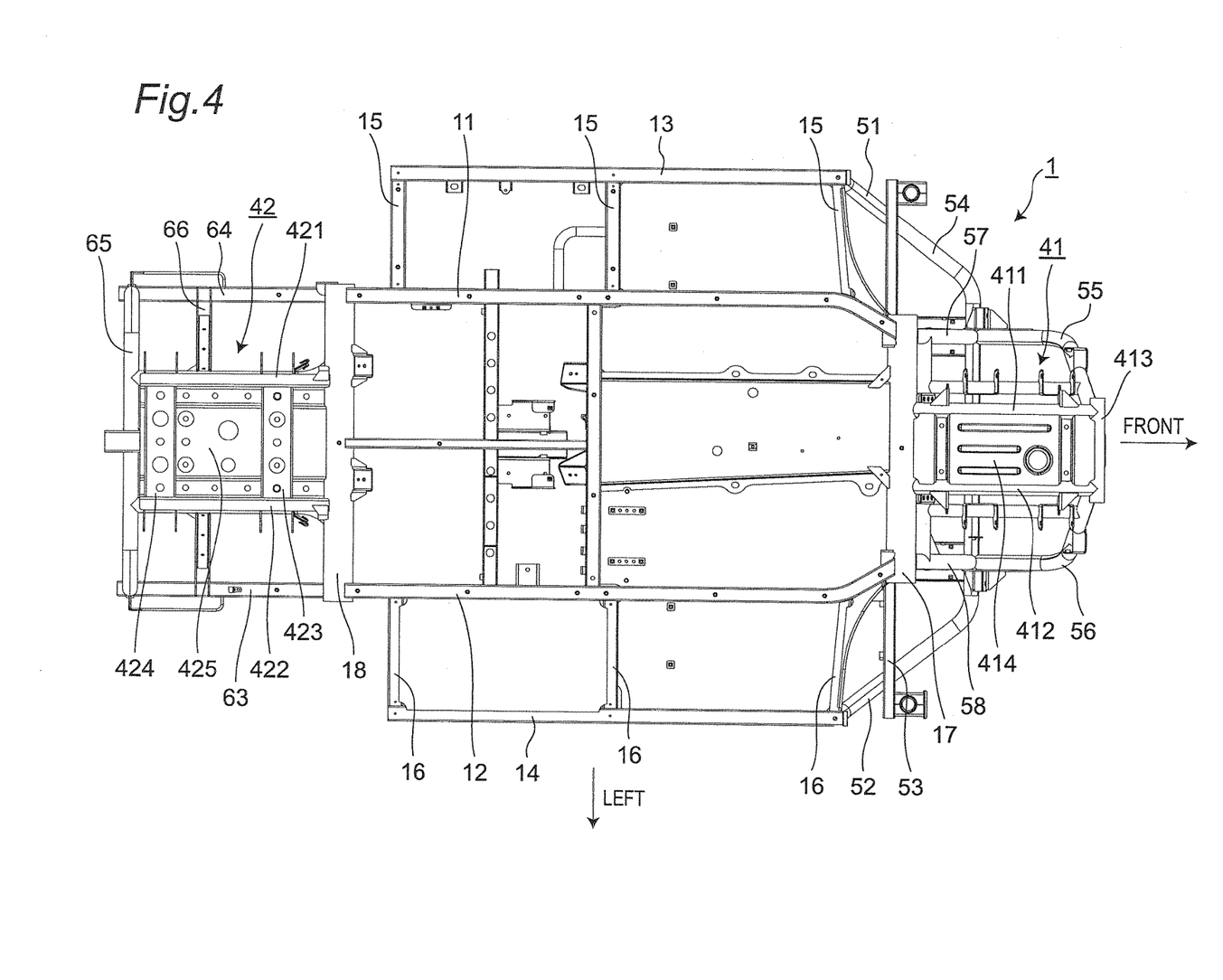
FIG. 4 is a bottom view of FIG. 2.
Figure 5:
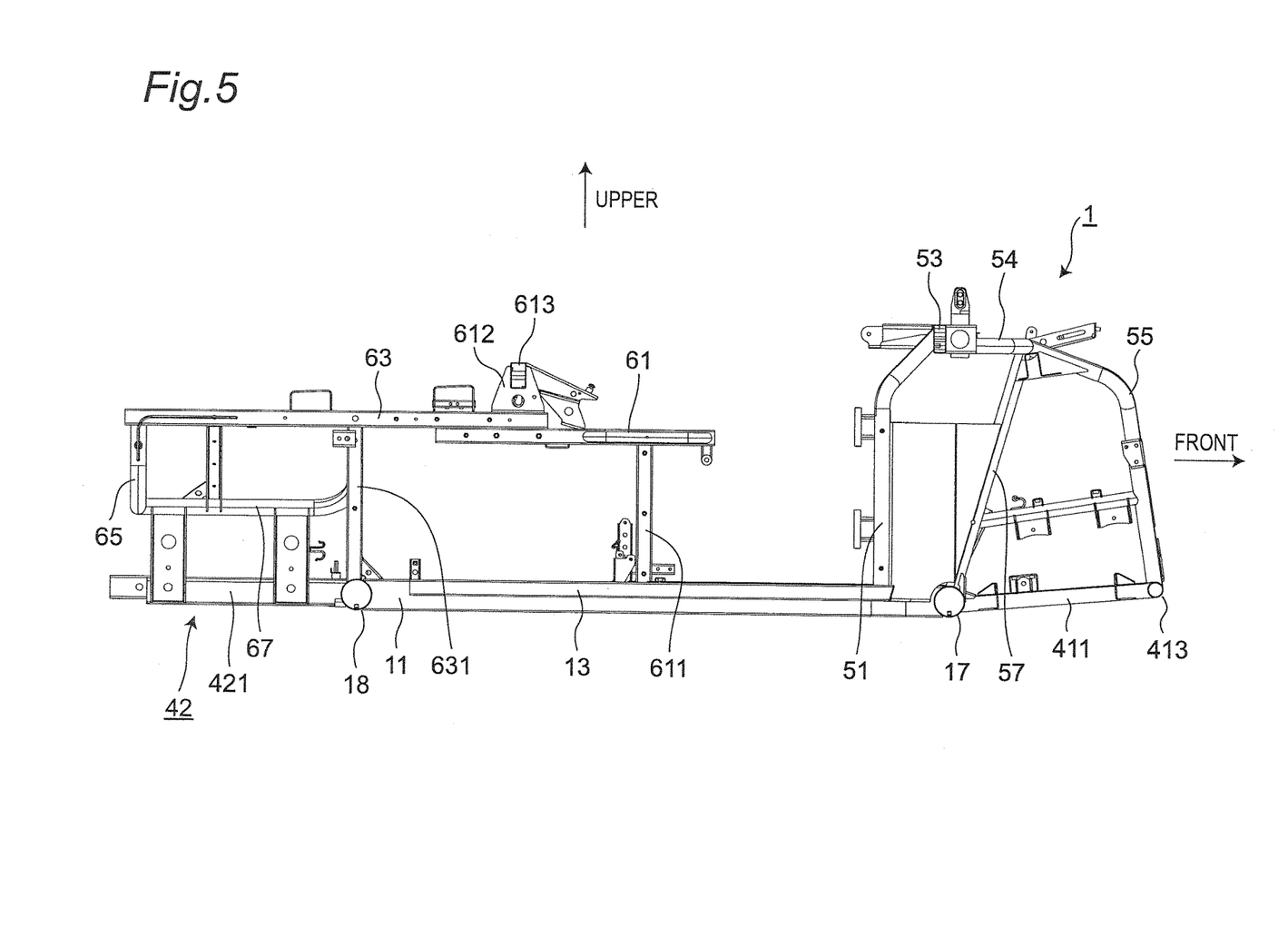
FIG. 5 is a right side view of FIG. 2.

FIG. 2 is a perspective view of the body frame 1 of the utility vehicle 10 of FIG. 1. FIG. 3 is a top view of FIG. 2, and FIG. 4 is a bottom view of FIG. 2. FIG. 5 is a right side view of FIG. 2. In FIGS. 2 to 5, the ROPS 24 of the body frame 1 is omitted.

As illustrated in FIGS. 2 to 5, the body frame 1 includes, in a bottom portion thereof, a pair of left and right bottom first frame 11 and bottom second frame 12 that extend substantially horizontally in a front-rear direction and support a floor plate 91 and a pair of left and right bottom side frames 13 and 14 that are provided on outer sides, in a vehicle width direction, of the bottom first frame 11 and the bottom second frame 12, extend substantially horizontally in the front-rear direction, and support the floor plate 91. The bottom first frame 11 and the bottom second frame 12 are square pipe frames.

The bottom first frame 11 and the bottom side frame 13 are coupled to each other by a plurality of bottom cross frames 15 that extend substantially horizontally in the vehicle width direction (left-right direction) and that are provided at certain intervals in the front-rear direction.

A door frame 51 that supports the door 25 is coupled to a front end of the bottom side frame 13. The door frame 51 extends upward from the front end of the bottom side frame 13 and then extends inward in the vehicle width direction toward the upper side.

The bottom second frame 12 and the bottom side frame 14 are coupled to each other by a plurality of bottom cross frames 16 that extend substantially horizontally in the vehicle width direction (left-right direction) and that are provided at certain intervals in the front-rear direction.

A door frame 52 that supports the door 25 is coupled to a front end of the bottom side frame 14. The door frame 52 extends upward from the front end of the bottom side frame 14 and then extends inward in the vehicle width direction toward the upper side.

The body frame 1 includes a bottom front frame 17 that couples a front end of the bottom first frame 11 and a front end of the bottom second frame 12 and that extends substantially horizontally in a linear manner in the left-right direction. The bottom front frame 17 is a cylindrical pipe frame.

A ROPS mount front frame 53 is provided above the bottom front frame 17. The ROPS mount front frame 53 extends substantially horizontally in the left-right direction and couples an upper end of the door frame 51 and an upper end of the door frame 52, and the ROPS 24 is coupled to the ROPS mount front frame 53. A front U shape frame 54 having a U shape protruding toward the front side is coupled to a front portion of the ROPS mount front frame 53.

A front gear support member 41 that supports a gear box for front wheels from below is provided ahead of the bottom front frame 17. The front gear support member 41 includes a pair of left and right front gear support frames 411 and 412 that extend in the front-rear direction so as to be inclined upward toward the front side, a front gear support front frame 413 that couples front ends of the front gear support frames 411 and 412, and a front gear under guard 414 having a rectangular shape that couples intermediate portions of the front gear support frames 411 and 412. The front gear support frames 411 and 412 are joined to the bottom front frame 17 by welding.

A pair of left and right front curved frames 55 and 56 are provided on a front portion of the front U shape frame 54. The front curved frames 55 and 56 extend from the front portion of the front U shape frame 54 downward toward the front side and then extend downward and are coupled to the front gear support front frame 413.

The front U shape frame 54 is coupled to left and right ends of the bottom front frame 17 by a pair of left and right front vertical frames 57 and 58 that extend downward and backward from a lower portion of the front U shape frame 54.

The body frame 1 includes a bottom rear frame 18 that couples a rear end of the bottom first frame 11 and a rear end of the bottom second frame 12 and that extends substantially horizontally in a linear manner in the left-right direction. The bottom rear frame 18 is a cylindrical pipe frame.

A rear gear support member 42 that supports a gear box for rear wheels from below is provided behind the bottom rear frame 18. The rear gear support member 42 includes a pair of left and right rear gear support frames 421 and 422 that extend substantially horizontally in the front-rear direction, a rear gear support intermediate frame 423 that couples intermediate portions, in the front-rear direction, of the rear gear support frames 421 and 422, a rear gear support rear frame 424 that couples rear portions, in the front-rear direction, of the rear gear support frames 421 and 422, and a rear gear under guard 425 having a rectangular shape that is supported by the rear gear support intermediate frame 423 and the rear gear support rear frame 424 from below. The rear gear support frames 421 and 422 are joined to the bottom rear frame 18 by welding.

A pair of left and right seat frames 61 and 62 that extend substantially horizontally in the front-rear direction and support the seats 31 are provided above the bottom first frame 11 and the bottom second frame 12. The seat frame 61 is coupled to the bottom first frame 11 by an intermediate vertical frame 611 extending in the top-bottom direction. The seat frame 62 is coupled to the bottom second frame 12 by an intermediate vertical frame 621 extending in the top-bottom direction.

An upper first frame 63 is provided above the seat frame 61. The upper first frame 63 is joined to an upper surface of a rear portion of the seat frame 61, extends substantially horizontally in the front-rear direction to a rear end of the vehicle body along the seat frame 61, and supports the cargo bed 27. An upper second frame 64 is provided above the seat frame 62. The upper second frame 64 is joined to an upper surface of a rear portion of the seat frame 62, extends substantially horizontally in the front-rear direction to the rear end of the vehicle body along the seat frame 62, and supports the cargo bed 27.

The upper first frame 63 is coupled to a right end of the bottom rear frame 18 by a rear vertical frame 631 extending in the top-bottom direction.

The upper second frame 64 is coupled to a left end of the bottom rear frame 18 by a rear vertical frame 641 extending in the top-bottom direction.

A ROPS mount rear frame 613 is provided above the upper first frame 63 and the upper second frame 64. The ROPS mount rear frame 613 extends substantially horizontally in the left-right direction and couples the upper first frame 63 and the upper second frame 64 via support members 612, and the ROPS 24 is coupled to the ROPS mount rear frame 613.

A rear end of the upper first frame 63 and a rear end of the upper second frame 64 are coupled by a rear U shape frame 65 having a U shape that extends in the left-right direction and protrudes downward. The upper first frame 63 and the upper second frame 64 are also coupled, at intermediate portions thereof in the front-rear direction, by a rear cross frame 66 that extends substantially horizontally in the left-right direction.

The rear vertical frame 631 and the rear U shape frame 65 are coupled by a rear L shape frame 67 having a substantially L shape that extends inward in the vehicle width direction and backward from an inner side surface, in the vehicle width direction, of the rear vertical frame 631.

The rear vertical frame 641 and the rear U shape frame 65 are coupled by a rear L shape frame 68 having a substantially L shape that extends inward in the vehicle width direction and backward from an inner side surface, in the vehicle width direction, of the rear vertical frame 641.

Figure 6:
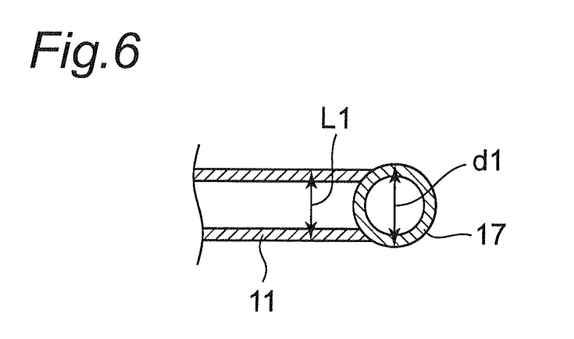
FIG. 6 is a longitudinal cross-sectional view of a part where a bottom front frame and a bottom first frame are coupled.

FIG. 6 is a longitudinal cross-sectional view of a part where the bottom front frame 17 and the bottom first frame 11 are coupled. As illustrated in FIG. 6, an external diameter d1 of the bottom front frame 17 is equal to or larger than a length L1, in the top-bottom direction, of a cross-sectional shape of the bottom first frame 11. Accordingly, the bottom first frame 11 is coupled to the bottom front frame 17 throughout the whole length L1, in the top-bottom direction, of the cross-sectional shape thereof. Note that a structure of coupling between the bottom front frame 17 and the bottom second frame 12 is similar to that between the bottom front frame 17 and the bottom first frame 11.

Figure 7:
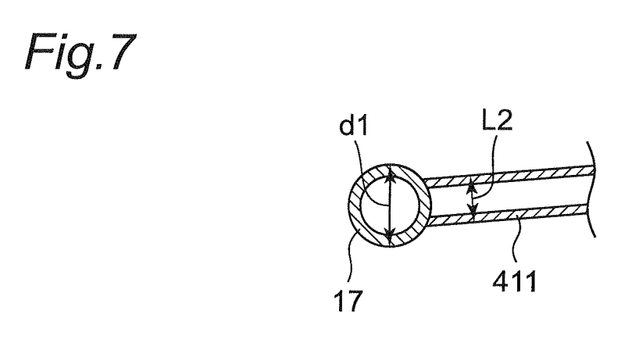
FIG. 7 is a longitudinal cross-sectional view of a part where the bottom front frame and a front gear support frame are coupled.

FIG. 7 is a longitudinal cross-sectional view of a part where the bottom front frame 17 and the front gear support frame 411 are coupled. As illustrated in FIG. 7, the external diameter d1 of the bottom front frame 17 is equal to or larger than a length L2, in the top-bottom direction, of a cross-sectional shape of the front gear support frame 411. Accordingly, the front gear support frame 411 is coupled to the bottom front frame 17 throughout the whole length L2, in the top-bottom direction, of the cross-sectional shape thereof. Note that a structure of coupling between the bottom front frame 17 and the front gear support frame 412 is similar to that between the bottom front frame 17 and the front gear support frame 411.

Figure 8:
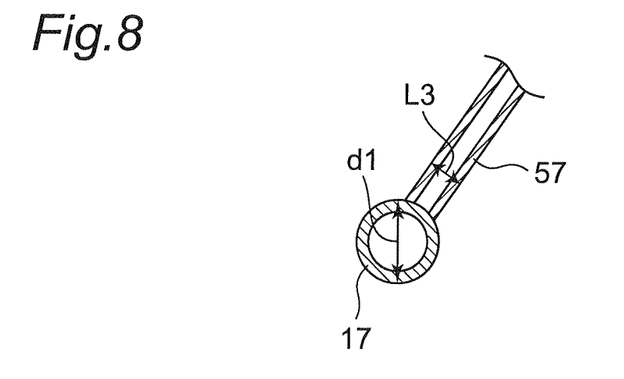
FIG. 8 is a longitudinal cross-sectional view of a part where the bottom front frame and a front vertical frame are coupled.

FIG. 8 is a longitudinal cross-sectional view of a part where the bottom front frame 17 and the front vertical frame 57 are coupled. As illustrated in FIG. 8, the external diameter d1 of the bottom front frame 17 is equal to or larger than a length L3 of a cross-section of the front vertical frame 57. Accordingly, the front vertical frame 57 is coupled to the bottom front frame 17 throughout the whole length L3 of the cross-section thereof. Note that a structure of coupling between the bottom front frame 17 and the front vertical frame 58 is similar to that between the bottom front frame 17 and the front vertical frame 57.

Figure 9:
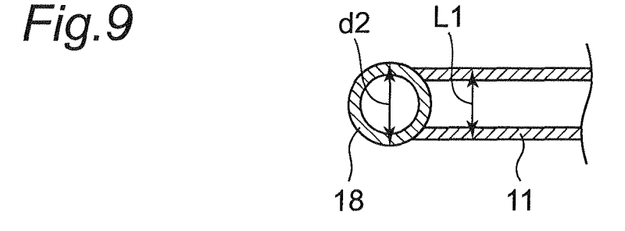
FIG. 9 is a longitudinal cross-sectional view of a part where a bottom rear frame and the bottom first frame are coupled.

FIG. 9 is a longitudinal cross-sectional view of a part where the bottom rear frame 18 and the bottom first frame 11 are coupled. As illustrated in FIG. 9, an external diameter d2 of the bottom rear frame 18 is equal to or larger than the length L1, in the top-bottom direction, of the cross-sectional shape of the bottom first frame 11. Accordingly, the bottom first frame 11 is coupled to the bottom rear frame 18 throughout the whole length L1, in the top-bottom direction, of the cross-sectional shape thereof. Note that a structure of coupling between the bottom rear frame 18 and the bottom second frame 12 is similar to that between the bottom rear frame 18 and the bottom first frame 11.

Figure 10:
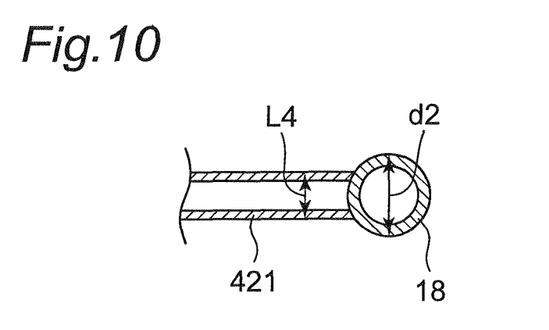
FIG. 10 is a longitudinal cross-sectional view of a part where the bottom rear frame and a rear gear support frame are coupled.

FIG. 10 is a longitudinal cross-sectional view of a part where the bottom rear frame 18 and the rear gear support frame 421 are coupled. As illustrated in FIG. 10, the external diameter d2 of the bottom rear frame 18 is equal to or larger than a length L4, in the top-bottom direction, of a cross-sectional shape of the rear gear support frame 421. Accordingly, the rear gear support frame 421 is coupled to the bottom rear frame 18 throughout the whole length L4, in the top-bottom direction, of the cross-sectional shape thereof. Note that a structure of coupling between the bottom rear frame 18 and the rear gear support frame 422 is similar to that between the bottom rear frame 18 and the rear gear support frame 421.

Figure 11:
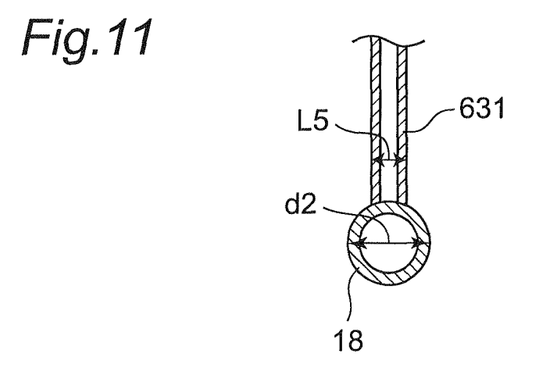
FIG. 11 is a longitudinal cross-sectional view of a part where the bottom rear frame and a rear vertical frame are coupled.

FIG. 11 is a longitudinal cross-sectional view of a part where the bottom rear frame 18 and the rear vertical frame 631 are coupled. As illustrated in FIG. 11, the external diameter d2 of the bottom rear frame 18 is equal to or larger than a length L5, in the front-rear direction, of a cross section of the rear vertical frame 631. Accordingly, the rear vertical frame 631 is coupled to the bottom rear frame 18 throughout the whole length L5, in the front-rear direction, of the cross section thereof. Note that a structure of coupling between the bottom rear frame 18 and the rear vertical frame 641 is similar to that between the bottom rear frame 18 and the rear vertical frame 631.

According to the above frame structure, the following effects can be produced.

(1) Since cylindrical pipe frames extending linearly in the vehicle width direction are provided on front and rear sides, the bottom front frame 17 and the bottom rear frame 18 and other frames are easily welded. As a result, it is possible to provide a simple frame structure of a utility vehicle while keeping predetermined strength and rigidity without the need to employ a configuration in which body frames are coupled in a front-rear direction and a vehicle width direction.

(2) Since the external diameter d1 of the bottom front frame 17 is equal to or larger than the cross-sectional shapes of the bottom first frame 11 and the bottom second frame 12, the bottom first frame 11 and the bottom second frame 12 can be coupled to the bottom front frame 17 throughout the cross sections thereof. This makes it possible to increase the area of coupling between the bottom front frame 17 and the bottom first frame 11 and the area of coupling between the bottom front frame 17 and the bottom second frame 12. It is therefore possible to increase strength and rigidity of the part where the bottom front frame 17 and the bottom first frame 11 are coupled and the part where the bottom front frame 17 and the bottom second frame 12 are coupled.

(3) Since the external diameter d1 of the bottom front frame 17 is equal to or larger than the cross-sectional shapes of the front gear support frames 411 and 412, the front gear support frames 411 and 412 can be coupled to the bottom front frame 17 throughout the cross sections thereof. This makes it possible to increase the area of coupling between the bottom front frame 17 and the front gear support frame 411 and the area of coupling between the bottom front frame 17 and the front gear support frame 412. It is therefore possible to increase strength and rigidity of the part where the bottom front frame 17 and the front gear support frame 411 are coupled and the part where the bottom front frame 17 and the front gear support frame 412 are coupled.

(4) Since the external diameter d1 of the bottom front frame 17 is equal to or larger than the cross-sectional shapes of the front vertical frames 57 and 58, the front vertical frames 57 and 58 can be coupled to the bottom front frame 17 throughout the cross sections thereof. This makes it possible to increase the area of coupling between the bottom front frame 17 and the front vertical frame 57 and the area of coupling between the bottom front frame 17 and the front vertical frame 58. It is therefore possible to increase strength and rigidity of the part where the bottom front frame 17 and the front vertical frame 57 are coupled and the part where the bottom front frame 17 and the front vertical frame 58 are coupled.

(5) Since the external diameter d2 of the bottom rear frame 18 is equal to or larger than the cross-sectional shapes of the bottom first frame 11 and the bottom second frame 12, the bottom first frame 11 and the bottom second frame 12 can be coupled to the bottom rear frame 18 throughout the cross sections thereof. This makes it possible to increase the area of coupling between the bottom rear frame 18 and the bottom first frame 11 and the area of coupling between the bottom rear frame 18 and the bottom second frame 12. It is therefore possible to increase strength and rigidity of the part where the bottom rear frame 18 and the bottom first frame 11 are coupled and the part where the bottom rear frame 18 and the bottom second frame 12 are coupled.

(6) Since the external diameter d2 of the bottom rear frame 18 is equal to or larger than the cross-sectional shapes of the rear gear support frames 421 and 422, the rear gear support frames 421 and 422 can be coupled to the bottom rear frame 18 throughout the cross sections thereof. This makes possible to increase the area of coupling between the bottom rear frame 18 and the rear gear support frame 421 and the area of coupling between the bottom rear frame 18 and the rear gear support frame 422. It is therefore possible to increase strength and rigidity of the part where the bottom rear frame 18 and the rear gear support frame 421 are coupled and the part where the bottom rear frame 18 and the rear gear support frame 422 are coupled.

(7) Since the external diameter d2 of the bottom rear frame 18 is equal to or larger than the cross-sectional shapes of the rear vertical frames 631 and 641, the rear vertical frames 631 and 641 can be coupled to the bottom rear frame 18 throughout the cross sections thereof. This makes it possible to increase the area of coupling between the bottom rear frame 18 and the rear vertical frame 631 and the area of coupling between the bottom rear frame 18 and the rear vertical frame 641. It is therefore possible to increase strength and rigidity of the part where the bottom rear frame 18 and the rear vertical frame 631 are coupled and the part where the bottom rear frame 18 and the rear vertical frame 641 are coupled.

(8) The bottom front frame 17 is a cylindrical pipe frame. A cylindrical pipe frame has high strength on a cross section throughout an entire circumference thereof unlike a square pipe frame, and in a case where the bottom first frame 11, the bottom second frame 12, the front gear support frames 411 and 412, and the front vertical frames 57 and 58 are joined to a cylindrical frame by welding, it is easy to provide the areas for the welding and the joining strength of the welding can be made high. Since the areas of the welding can be made large, the welding can be easily performed. Meanwhile, a square pipe frame has high strength at corner portions thereof but has low strength at linear portions thereof. Accordingly, in a case where the frames are welded to a square pipe frame, the frames are welded to the corner portions, and it is therefore difficult to provide sufficient areas for the welding.

(9) The bottom rear frame 18 is a cylindrical pipe frame. A cylindrical pipe frame has high strength on a cross section throughout an entire circumference thereof unlike a square pipe frame, and in a case where the bottom first frame 11, the bottom second frame 12, the rear gear support frames 421 and 422, and the rear vertical frames 631 and 641 are joined to a cylindrical frame by welding, it is easy to provide the areas for the welding and the joining strength of the welding can be made high. Since the areas for the welding can be made large, the welding can be easily performed.

(10) Since the bottom front frame 17 and the bottom rear frame 18 are provided in a bottom portion of the vehicle body, skid performance of the body frame on an obstacle on a road can be improved by using cylindrical pipe frames as the bottom front frame 17 and the bottom rear frame 18.

Figure 12:
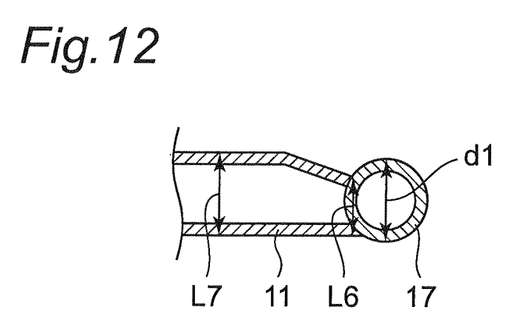
FIG. 12 illustrates a modification and is a longitudinal cross-sectional view of a part coupled with a bottom front frame.

In the above embodiment, the bottom first frame 11, the bottom second frame 12, the front gear support frames 411 and 412, and the front vertical frames 57 and 58 each have a uniform cross-sectional shape. However, for example, each of these frames may be configured such that a part thereof coupled to the bottom front frame 17 has a cross-sectional shape (a length L6 in the top-bottom direction) that is equal to or smaller than the external diameter d1 of the bottom front frame 17 and the other part thereof has a larger cross-sectional shape (a length L7 in the top-bottom direction), as illustrated in FIG. 12. With such a structure, it is possible to further increase the strength of the whole structure while allowing these frames to be coupled to the bottom front frame 17 throughout the cross sections thereof.

In the above embodiment, the bottom first frame 11, the bottom second frame 12, the rear gear support frames 421 and 422, and the rear vertical frames 631 and 641 each have a uniform cross-sectional shape. However, for example, each of these frames may be configured such that a part thereof coupled to the bottom rear frame 18 has a cross-sectional shape that is equal to or smaller than the external diameter d2 of the bottom rear frame 18 and the other part thereof has a larger cross-sectional shape, as in the structure illustrated in FIG. 12. With such a structure, it is possible to further increase the strength of the whole structure while allowing these frames to be coupled to the bottom rear frame 18 throughout the cross sections thereof.

Various modifications and changes can be made without departing from the spirit and scope of the present invention described in the claims.

The invention claimed is:

1. A frame structure of a utility vehicle, comprising:
a left bottom first frame and a right bottom second frame that extend in a front-rear direction and support a floor plate;
a bottom front frame that couples a front end of the left bottom first frame and a front end of the right bottom second frame and extends linearly in a vehicle width direction and to which a first support member for a first gear box for front wheels is welded;
a bottom rear frame that couples a rear end of the left bottom first frame and a rear end of the right bottom second frame and extends linearly in the vehicle width direction and to which a second support member for a second gear box for rear wheels is welded; and
a left bottom side frame and a right bottom side frame that extend substantially horizontally in the front-rear direction and support the floor plate,
wherein:
the bottom front frame is located in front of the left bottom side frame and the right bottom side frame,
the bottom rear frame is located posterior to the left bottom side frame and the right bottom side frame,
the left bottom side frame is on a left outer side, in the vehicle width direction, of the left bottom first frame,
the right bottom side frame is on a right outer side, in the vehicle width direction, of the right bottom second frame, and
each of the bottom front frame and the bottom rear frame is a cylindrical pipe frame.

2. The frame structure according to claim 1, wherein:
an external diameter of the bottom front frame is equal to or larger than a shape of a cross section of the left bottom first frame at a part thereof coupled to the bottom front frame, and
the external diameter of the bottom front frame is equal to or larger than a shape of a cross section of the right bottom second frame at a part thereof coupled to the bottom front frame.

3. The frame structure according to claim 1, wherein an external diameter of the bottom front frame is equal to or larger than a shape of a cross section of the first support member at a part thereof coupled to the bottom front frame.

4. The frame structure according to claim 1, wherein:
an external diameter of the bottom rear frame is equal to or larger than a shape of a cross section of the left bottom first frame at a part thereof coupled to the bottom rear frame, and
the external diameter of the bottom rear frame is equal to or larger than a shape of a cross section of the right bottom second frame at a part thereof coupled to the bottom rear frame.

5. The frame structure according to claim 1, wherein an external diameter of the bottom rear frame is equal to or larger than a shape of a cross section of the second support member at a part thereof coupled to the bottom rear frame.

* * * * *